United States Patent [19]

Bauer

[11] 4,074,782

[45] Feb. 21, 1978

[54] HYDRAULIC SYSTEM OF A SKID STEER LOADER

[75] Inventor: James J. Bauer, Lisbon, N. Dak.

[73] Assignee: Clark Equipment Company, Buchanan, Mich.

[21] Appl. No.: 654,259

[22] Filed: Feb. 2, 1976

[51] Int. Cl.² .......................................... B62D 11/04
[52] U.S. Cl. ...................................... 180/6.48; 60/455; 91/486
[58] Field of Search ................. 180/6.48; 91/486, 487, 91/488; 60/455, 486; 418/210, 212

[56] References Cited

U.S. PATENT DOCUMENTS

| D. 224,588 | 8/1972 | Bauer | D12/57 |
| D. 231,482 | 8/1974 | Bauer | D6/95 |
| 3,066,609 | 12/1962 | Hann | 91/488 |
| 3,177,666 | 4/1965 | Reinke | 60/455 |
| 3,635,365 | 1/1972 | Bauer | 214/778 |
| 3,895,728 | 7/1975 | Heggen | 214/140 |
| 3,903,978 | 9/1975 | Kraus | 180/6.48 |

Primary Examiner—Joseph F. Peters, Jr.
Assistant Examiner—John A. Pekar
Attorney, Agent, or Firm—Harry G. Thibault

[57] ABSTRACT

A skid steer loader comprising an improved loader main frame and including an operator's compartment designed to present a low profile vehicle particularly suitable for low clearance applications. A improved hydraulic system for the vehicle includes a new arrangement of an implement pump interconnected with the hydraulic drive pumps of the steering system of the vehicle. An internal connection between the drive pumps and the implement pump substantially improves the flow of hydraulic fluid through the system by providing an internal passage for flow of excess hydraulic fluid from a drive pump to the implement pump to supply the implement pump with inlet fluid.

1 Claim, 8 Drawing Figures

HYDRAULIC SYSTEM OF A SKID STEER LOADER

FIELD OF THE INVENTION

This invention pertains to the art of skid steer loaders and more particularly to an improvement in the hydraulic system of an improved loader adapted to provide an improved operator's module and to incorporate a low profile particularly suitable for low clearance applications.

BACKGROUND OF THE INVENTION

Skid steer loaders are vehicles possessing a high degree of maneuverability which are propelled and maneuvered by driving the wheels on one side of the vehicle at a different speed and/or in a different direction from those on the other side of the vehicle so as to achieve a turning motion. In the case where the wheels on one side are driven forwardly and those on the opposite side reversely, the loader will turn on its axis or, in other words, spin in its tracks. However, the operator's compartment of such vehicles are typically constricted, with the operator surrounded by the working elements of his machine and buffeted by engine and transmission noise.

Typically, the skid steer loader's high levels of maneuverability are put to best use in operations wherein the loader's steering abilities easily enable it to negotiate around obstacles such as struts, columns and supports encountered in an enclosed environment and used to support the structure in which the loader is working. However, in many instances, particularly in agricultural applications, the requirements of the job include a necessity for a machine which has the ability to work under conditions of low clearance as well as conditions requiring high maneuverability. Such low clearance applications requiring a low profile vehicle suggest a further encroachment of the operator's space. Further, the necessity of providing a protective enclosure for the machine operator has heretofore limited the low clearance capability of such skid steer loaders. Heretofore low vehicle clearance has been achieved only at a sacrifice in load capability and power, and with additional encroachment on the operator's compartment.

DESCRIPTION OF THE PRIOR ART

The prior art vehicles generally present an upright box-like structure of uniform body width wherein all structural members are located inside the inner face of the wheels mounted on the vehicle. A skid steered loader having such a body construction and employing a hydrostatic drive comprising two independent variable speed transmissions, one mounted on each side for driving their respective sets of wheels, is disclosed in U.S. Pat. No. 3,635,365 entitled "Tractor Vehicle with Hydrostatic Drive Means" by James J. Bauer which issued Jan. 18, 1972 to the assignee of the present invention. The design of that vehicle is also the subject of U.S. Pat. No. Des. 224,588 entitled "Self-Propelled Loader Vehicle" by the same inventor, issued Aug. 8, 1972 also assigned to the assignee of the present invention.

Efforts to improve the mobility of a skid steer loader vehicle also involved body design. For example, it is known that a skid steer loader should preferably have a wheel base shorter than the center-to-center distance between the wheels on opposite sides of the loader to reduce tire wear and resistance to skid turns. Further, proper weight distribution in a skid steer vehicle improves mobility. Thus the engine is located in the rear and partially counterweights the loader bucket in front. An earlier attempt to change the body design of the vehicle is disclosed in U.S. Pat. No. 3,895,728 entitled "Tractor Vehicle Having Material Handling Subframe" by John P. Heggen which issued July 22, 1975 to the assignee od the present invention. Although the frame described in the above patent was designed to isolate the loader and skid steering forces of the vehicle from the drive components, no consideration was given to improving the operator's compartment of such vehicle or designing such frame for low clearance applications.

An early effort to change the profile of the skid steer loader is shown in U.S. Pat. No. Des. 231,482, entitled "Self-Propelled Loader Vehicle" by James J. Bauer, issued Apr. 23, 1974, and assigned to the assignee of the present invention. This latter vehicle represents a scaled down version of a larger vehicle with some design modifications. The rear loader uprights and the boom arms project outwardly from the side frames to overlie the wheels of the vehicle, but an offset knee must be provided at the front end of the boom arms to accommodate power cylinders mounted on each loader arm for operating the loading bucket. Further, the operator enclosure becomes a fairly narrow, high enclosure, severely restricting side-to-side movement of the operator. Further, the load carrying capacity of such vehicle is severely limited since it remains primarily a scaled down version of a larger model.

The present invention represents a substantial innovative advance over the prior art in that a vehicle having a mid-range operating capacity (800 lbs. load capability) presents a wider and lower profile specially suited for low clearance, agricultural applications with little sacrifice in operating capacity, and substantial increase in operator compartment space.

Further substantial innovative advances have been made to accomplish the low profile of the present vehicle without sacrificing any substantial operating capacity and with marked improvement in operator comfort as summarized below.

SUMMARY OF THE INVENTION

The present invention comprises an improved main frame for a skid steer loader vehicle, the main frame comprising a center compartment partially defined by a pair of longitudinally extending, laterally spaced side beams. At the rear of the center compartment the main frame integrates a number of structural elements therefor to provide an acoustic enclosure for the engine for dissipating engine noises. Operator comfort is enhanced by substantially reduced noise levels for the loader in the operative mode. The improved acoustic enclosure for the engine reduces noise levels substantially, making the improved loader one of the quietest in the industry.

A cross plate is welded between the longitudinally extending laterally spaced side beams at respective rear bottom portions to form a partial floor at the rear of the main frame. A front wall having an inwardly turned top flange is secured between the side beams at respective front portions thereof. A transmission case presenting an elongated, substantially narrow, profile is mounted at a forward end of the side beams to form a partial floor at the front of the main frame for a center compartment of the main frame. Skid steering forces as well as the normal loader forces are largely isolated from the drive components associated with and contained in the case. The interior compartment formed receives the engine at a rear portion thereof. The main frame substantially surrounds the center compartment in laterally spaced relation.

Protruding from the case at respective front and rear ends thereof are the stub axles for the vehicle. Brackets mounted on the stub axles secure the case to the side beams of the main frame. Housed within the transmission case is the chain and sprocket drive for each set of wheels for the vehicle. Bolted to the outside of the transmission case are a pair of hydraulic motors which drive their respective set of wheels through the chain and sprocket drive contained within the transmission case. The transmission case is oil filled to lubricate the drive for the vehicle. The mounting of the drive motors on the outside of the case permits a relatively long, narrow configuration for the case enabling a re-design of the operator's compartment which substantially increases the amount of leg room in the operator's space by permitting the operator to straddle the transmission case.

The engine is rubber mounted on the bottom cross plate provided at the rear of the center compartment. Suitably secured to the engine are dual axially aligned variable displacement pumps which drive the motors mounted on the transmission case.

Disposed at one end of the drive pumps in axial alignment therewith is an implement pump interconnected with the drive pumps. An internal connection between the drive pumps and the implement pump substantially improves the flow of hydraulic fluid throughout the system. Mounted between an operator compartment and the engine is a hydraulic reservoir for the pumps.

A pair of uprights are fabricated from plate material and are mounted at the rear of the side beams to structurally support loader arms mounted at upper pivotal mountings on each side. In the preferred embodiment the uprights are disposed outwardly of the main frame to lie behind the wheels mounted on the axles secured to the main frame of the vehicle. With the uprights of the loader vehicle lying behind the wheels of the vehicle, the loader arms, of necessity, must overlie the wheels of the vehicle. Accordingly, the front end of each loader arm has been arcuately proportioned to overlie the front wheels of the vehicle and to receive the outer end of the loader bucket thereon. To achieve this configuration the tilt cylinder for the loading bucket must be mounted inboard of the loader arms and the present invention incorporates a single mid-plane bucket tilt cylinder replacing the two cylinders mounted co-planar with the loader arms in the prior art.

The improved transmission case, as well as the outboard mounted loader arms, provides a wider, lower profile for the operator's compartment and permits a substantial reduction in the height of the overhead guard for the vehicle without reducing overall compartment height and a substantial increase in compartment width.

The advantages recited above, as well as many others, will become more apparent to the reader in the detailed description set forth below when said description is viewed in conjunction with the drawings provided which are described as follows.

DESCRIPTION OF THE PREFERRED EMBODIMENT

Figure 1:
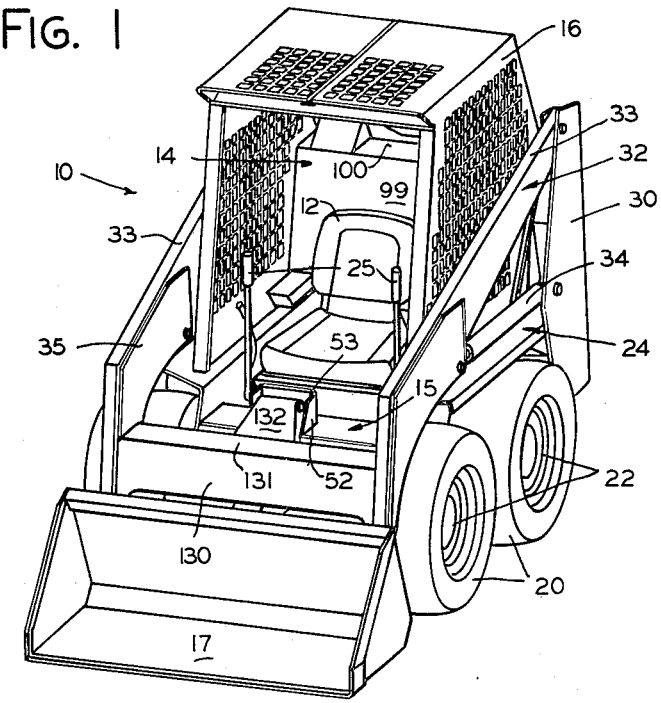
FIG. 1 is a perspective view of a skid steer loader constructed in accordance with the present invention.
Figure 2:
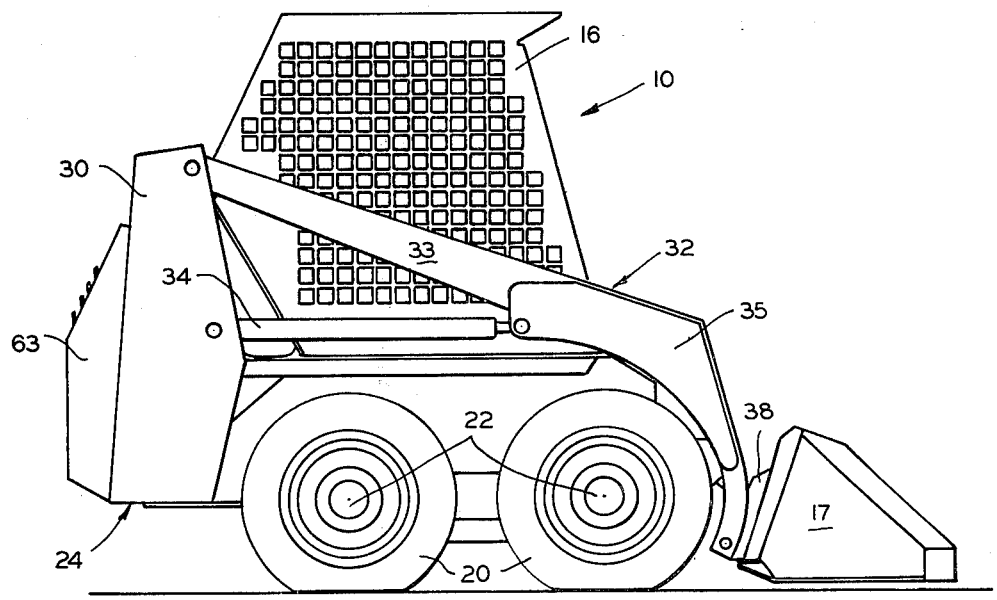
FIG. 2 is a side elevational view of the skid steer loader of FIG. 1.

FIGS. 1 and 2 show perspective and side elevational views of a rigid frame, skid steer end loader 10 having the general arrangement of an operator's seat 12 in the middle of the loader with an engine space 14 at the rear and a space 15 at the front for the operator's legs. The operator's compartment area is enclosed by an overhead framework or guard 16 providing protection against objects falling on to the operator from above, such as materials spilling over the rear of a bucket 17 when in a raised position. The overhead guard 16 also serves as a roll-over protective structure. Wheels 20 are mounted on stub axles 22 projecting outwardly from opposite sides of the vehicle body or main frame 24.

It will be understood by those acquainted with skid steer loaders that the vehicle 10 is propelled through a turning motion by driving the wheels 20 on one side at a different speed and/or direction than those on the other side, causing the vehicle to have great mobility or maneuvering in either the forward or reverse direction. The "steering" is controlled by the operator using a pair of levers 25, one on each side of the operator's seat 12, which may be moved independently in a fore and aft direction to cause the wheels 20 on that side of the machine to rotate at a speed and in a direction corresponding to the direction of the lever 25. For example, both levers 25 may be moved together in either a forward or rearward manner causing the loader to travel straightforward or back up at variable speeds depending on the position of the lever. Or, the operator may move the levers simultaneously but to a greater degree on one side than the other, thus causing the loader to execute a turn. Or, by pushing one lever in one direction and pulling the other in the opposite direction the loader is turned on its axis or spun around virtually in its own tracks.

At the rear is a pair of rear posts or uprights 30 having pivotally mounted at respective upper ends thereof a boom assembly 32. The uprights 30 are disposed outwardly of the vehicle body 24 and lie behind the wheels 20 provided on either side of the vehicle. A pair of lift arms 33 of the boom assembly 32 overlie the wheels 20 on each side of the vehicle 10 and extend forwardly alongside the operator's compartment and project arcuately downwardly at the front of the machine to overlie the front of the wheels 20. Mounted at the forward end of the lift arms 33 is the bucket 17. A boom lift cylinder 34, one on each side, is pivotally mounted at the rear end to the upright 30 and the rod end to a pair of laterally spaced gusset plates 35 mounted on the lift arm 33. A bucket tilt cylinder 37 is suitably mounted between the front ends of the loader arms 33 for pivotal movement at the cylinder end and at the rod end to a bucket mounting attachment 38 which pivotally mounts the bucket 17 to the arms 33 at the point 39. By means of foot pedals provided in space 15 or auxiliary controls (not shown) associated with the levers 25 the operator is able to control independently the extension and retraction of the lift and tilt cylinders 34, 37 when working with the machine. It will be understood that while an end loader is depicted in the drawings, the machine may be outfitted with various attachments other than the bucket 17.

Figure 3:
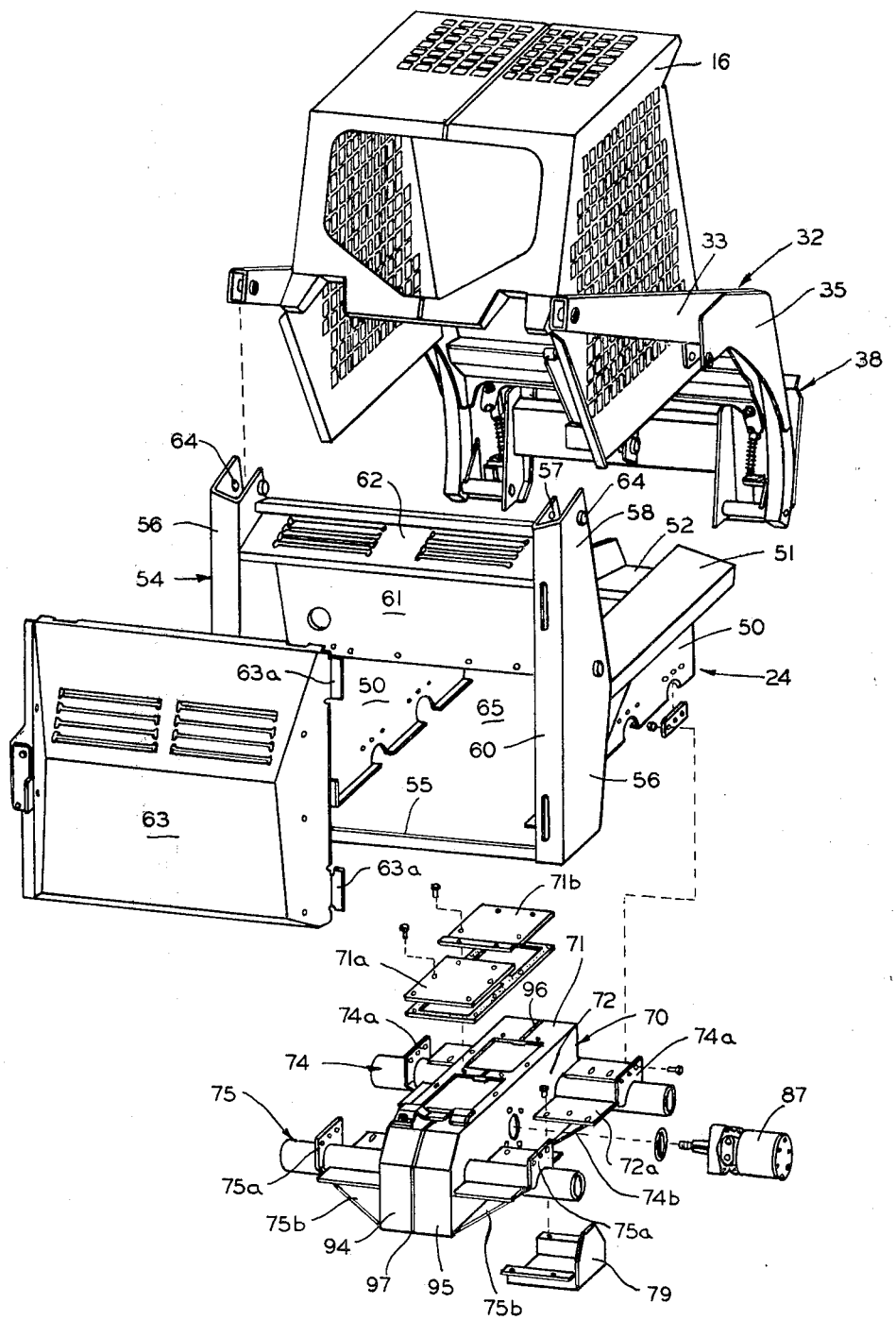
FIG. 3 is an exploded perspective view of the main frame of the skid steer loader showing the major structural elements of the vehicle, as viewed from the rear thereof.

Referring now to FIG. 3 main frame 24 of the vehicle 10 includes a pair of longitudinally extending, laterally spaced side beams 50 having outwardly directed upper flanges 51 which overlie the wheels 20 and serve as protective fenders for the vehicle. The side beams 50 are joined at the front by front wall member 52 and at the rear by a post or upright fabrication 54 including a bottom crossmember 55. The upright fabrication 54 includes a pair of uprights 56, formed of plate material, wider at the bottom and tapering upwardly toward the top. Each upright 56 comprises a pair of laterally spaced side portions 57 and 58, joined by a vertically extensive rear portion 60, the inner side portion 57 abutting the side beam 50, the side portion 58 spaced outwardly therefrom to provide a channel therebetween. Front crossmember 61 and top crossmember 62 extend between uprights 56 at the front and top thereof and a door 63 extends between uprights 56 at the rear thereof. A pivotal mounting location 64 is provided at the upper end of each upright 56 for each of the lift arms 33 of the boom assembly 32. The uprights 56 are mounted on the outside of the side beams 50 and are thus disposed outwardly of a center compartment 65 provided in the main frame 24.

The center compartment 65 of the main frame 24 is largely open and carries a sub-frame or transmission case 70 at a lower front portion thereof, the case 70 having front and rear stub axles 74, 75 mounted thereon, with respective flanges 74a, 75a laterally spaced from the case 70 being welded to outer ends of the stub axles 74. Gusset plates 74b, 75b (FIG. 3) are provided between the flanges 74a, 75a and a lower edge of the case 70. The flanges 74a, 75a are used to secure the case 70 to the side walls 50 of the main frame 24.

The main frame 24 further includes the boom assembly 32 mounted on uprights 56 at pivotal mounting locations 64. The overhead guard 16 is mounted on flanges 51 of side beams 50 of the main frame 24.

Referring now to structural elements of the main frame 24:

Transmission Case

Figure 4:
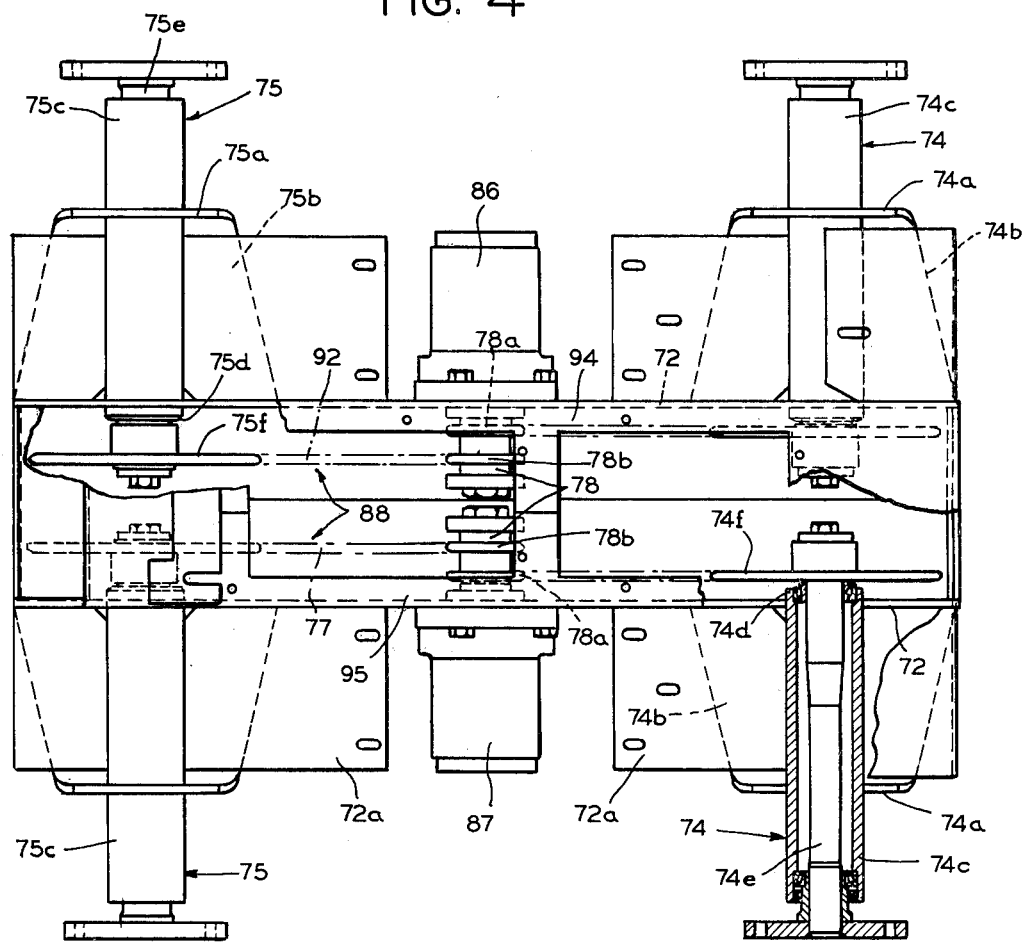
FIG. 4 is a top plan view of the transmission case shown at the bottom of FIG. 3, the case having portions removed for clarity.
Figure 5:
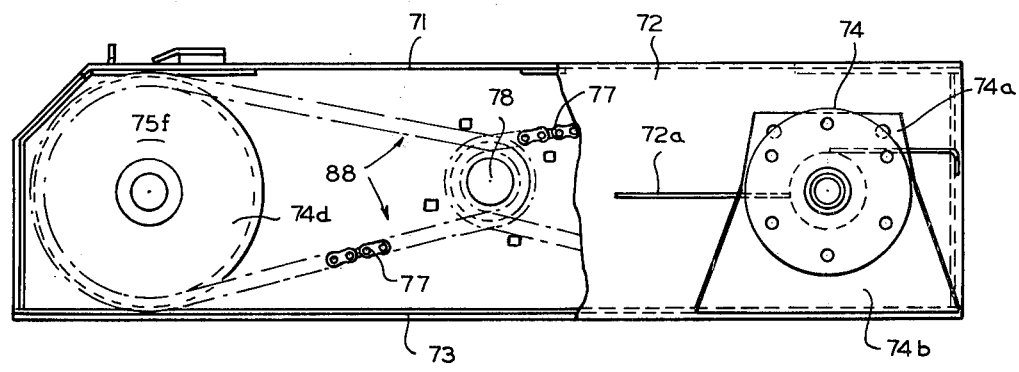
FIG. 5 is a side elevational view of FIG. 4, with portions of the case being removed for clarity.

Referring now to FIGS. 3, 4 and 5, the sub-frame or transmission case 70 comprises top wall 71, side walls 72 and bottom wall 73. Front and rear stub axles 74, 75 project from opposite sides of the case 70 adjacent each end. Axle housings 74c, 75c are welded to the side walls 72 of the case 70 and open at respective inner ends 74d, 75d into the compartment 70. Stub axle shafts 74e, 75e are rotatably journalled in axle housings 74c, 75c and carry at their inner ends wheel sprockets 74f, 75f which are connected by chains 77 to the drive sprockets of a motor output shaft 78. In FIG. 3, it can be seen that the transmission case 70 is divided into halves 94 and 95, the halves 94 and 95 being welded together along a peripheral seam shown as 96, 97 at top wall 71 and end wall 76 of the transmission case 70. The front and rear axle housings 74c, 75c are welded to the separate halves of the transmission case prior to assembly. The axle housings are then bored prior to assembly and the halves 94, 95 are then welded together. Openings in the top walls 71 provide access to the interior of the case 70 with axle shafts 74e, 75e rotatably journalled in the axle housings 74c, 75c therethrough. The chain and sprocket drives for the vehicle are then installed in place. Cover plates 71a and 71b are then mounted on the top wall 71 to complete assembly of the case 70.

The transmission case 70 presents an elongated substantially narrow profile, with side walls 72 laterally displaced from the side beams 50 of the main frame 24 when the case 70 is mounted in place. Lateral flanges 72a, having longitudinal edges secured to side walls 72 are mounted on the front and rear stub axles 74, 75 to provide floor plates for the bottom of the operator's compartment 14, enabling an operator seated in compartment 14 to straddle the case 70.

The hydraulic drive means for the vehicle 10 comprises first and second variable displacement pumps 85 (FIG. 6) driven on a common shaft connected to the engine drive shaft. First and second pumps 85a, 85b are mounted on an upper surface of top wall 71 of the case 70. Mounted on respective outer surfaces of opposite side walls 72 of the case 70 are first and second hydraulic motors 86, 87. The mounting of hydraulic motors 86, 87 is best shown in FIG. 4. Each hydraulic motor has an output shaft 78 extending into the transmission case which carries at an inner end thereof drive sprockets 78a and 78b. The drive sprockets 78a and 78b comprise portions of chain and sprocket drives 88 provided for each set of wheels 20 and carried in the transmission case 70. Endless chains 77 connect drive sprockets 78a, 78b to the wheel sprockets 74f, 75f carried on the inner ends 74d, 75d of the stub axle shafts 74e, 75e of the front and rear stub axles 74, 75. Drive sprocket 78a lies adjacent the side wall 71 of the transmission case 70. A first endless chain 77 connects the drive sprocket 78a to the front wheel sprocket 75f carried at the inner end 74d of front axle 74. Drive sprocket 78b, carried at the outer end of the output shaft 78, is connected by a second endless chain 77 to the wheel sprocket 75f carried at the inner end 75d of rear axle 75. The relative position of the sprockets 78a, 78b balances the moments of force exerted on the output shaft 78 by the drives for the front and rear wheels of the vehicle.

No additional gear reduction means such as those disclosed in U.S. Pat. No. 3,895,728, supra, are required. Hydraulic motors 86, 87 mounted on the outside of the transmission case are of the rolling vane Geroller type which possess inherent gear reduction capability. Any additional gear reduction required is achieved by the difference in the size of the drive sprocket 78 and the wheel sprockets 74f, 75f for the chain and sprocket drives 88. First and second pumps 85a, 85b are operatively connected by means of hydraulic hoses to the first and second hydraulic motors 86, 87 mounted on the outside of the transmission case 70.

It will be appreciated that each of the first and second variable displacement pumps 85a and 85b include a circular array of pistons and cylinders which revolve against swash plates which may be tilted by means of a control linkage to vary the displacement of the pumps 85a, 85b. The control linkage provided for the variable displacement pumps 85a, 85b may be like that shown in application Ser. No. 635,559, now Patent No. 4,043,416, entitled "Skid Steered Tractor Vehicle Combined Steering Lever and Auxiliary Control with Self-Centering Mechanism" filed Nov. 26, 1975 and assigned to the assignee of the present invention.

Engine Enclosure

Figure 6:
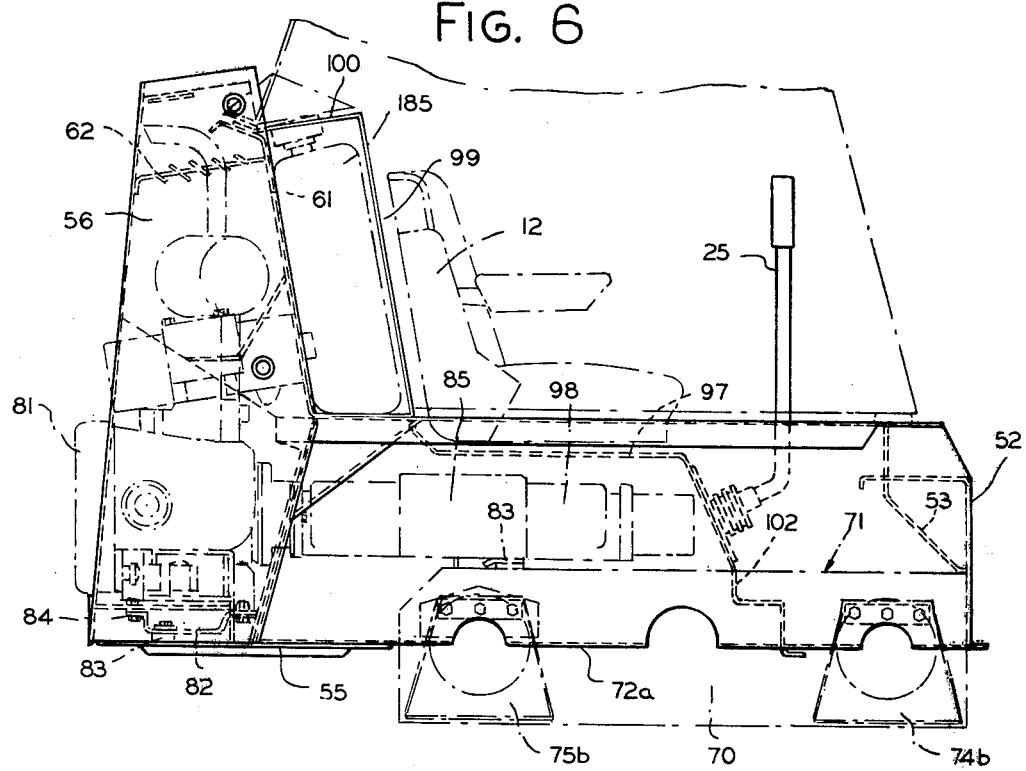
FIG. 6 is a side elevational view of the main frame of the skid steer loader with certain elements associated with the operator's compartment added for clarity.

As best seen in FIG. 6, mounted at the rear of the center compartment 65 of the main frame 24 is an engine 81 mounted on the rear crossplate 55. The engine 81 is secured to channel shaped mounting bracket 82, bracket 82 having rubber mounting locations 83 for the engine 81. Fasteners 84 secure the engine 81 to the rubber mount 83 on the crossbar 55. At the forward end of the engine 81, the engine is connected to a dual, variable displacement hydraulic pump 85 by the engine shaft (not shown). The forward end of the pump is mounted on the top wall 71 of the transmission case 70 at forward mount 83. Uprights 56 and bottom, front and top crossmembers 55, 61 and 62 and the rear door 63, partially enclose the engine 81. Floor plates 72a are joined to a connecting closure 79 secured between floor plates 72a to completely enclose the lower front portion of compartment 65. A seat pan 97 which is secured to flanges 51 of the main frame 24 to extend between upper edges of side beams 50 forms a top portion of an enclosure 98 for the compartment 65. A seat pan extension member 99 extends upwardly from the rear edge of the seat pan 97, terminating at a rearwardly directed upper flange 100, the flange 100 secured to an upper extension of the upright front cross member 61. Front panels 102 extend between the seat pan 97 and the case 70, to close the forward end of the enclosure 98, with outer front panels 102 joining the case at side flanges 72a and an inner front panel 102 joining the case 70 at top wall 71.

Louvers 62a are provided in top crossmember 62 to dissipate engine noises toward the rear end away from the operator compartment to minimize engine noise levels. Rear door 63 mounted on one upright 56 and locked on the opposing upright 56, encloses the rear end of the engine 81. Hinges 63a are inserted into openings provided in the first upright 56 to support the door 63. The door 63 also has louvers 63b to admit entering air to the carburetor of the engine. Uprights 56, crossmembers 55, 61 and 62, rear door 63, seat pan 97, front panels 102, the transmission case 70 and floor plates 72a and closure 79 comprise the enclosure 98 designed to reduce engine and transmission noise.

Hydraulic System

Figure 7:
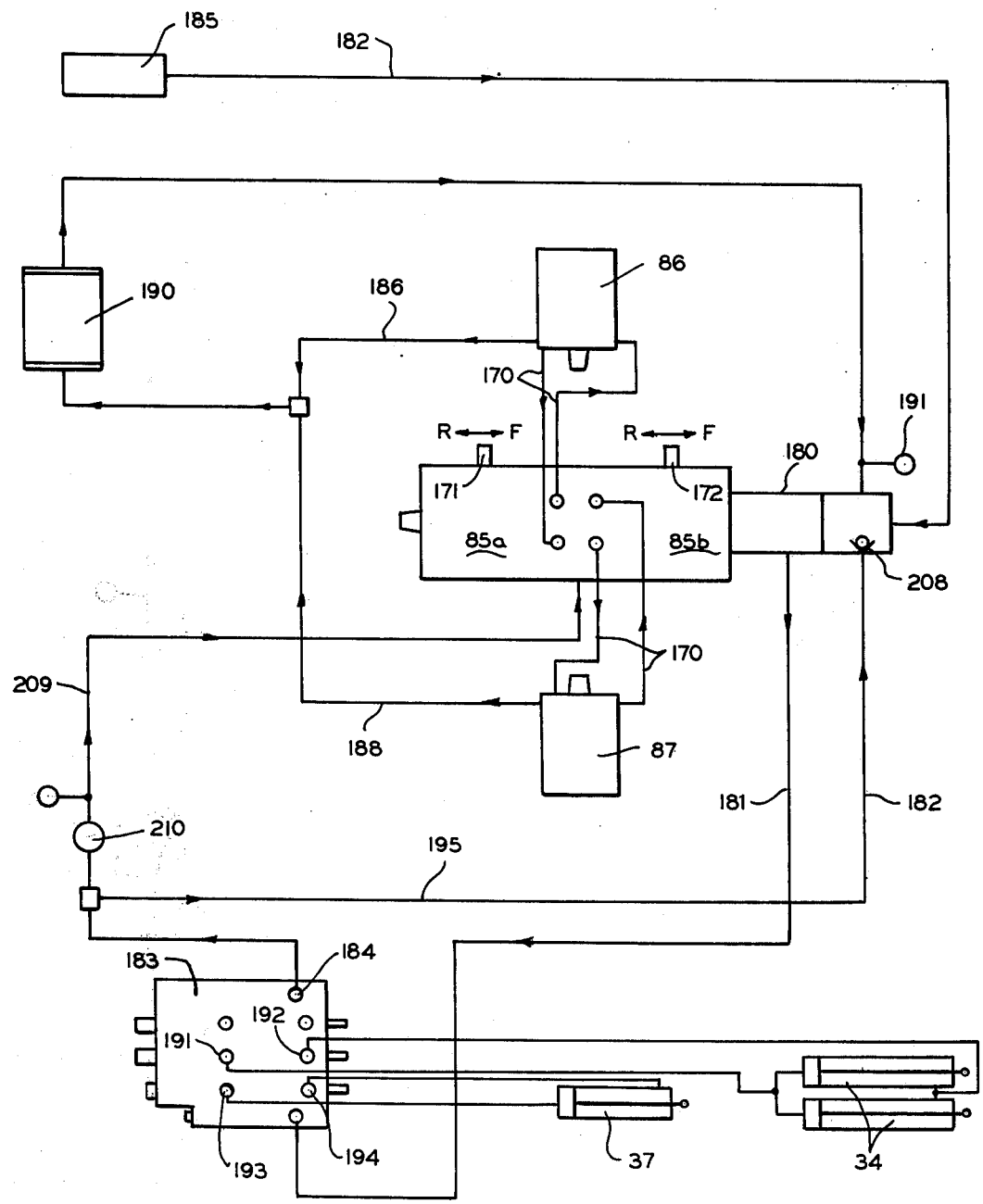
FIG. 7 is a schematic of the hydraulic drive system of the skid steer loader.
Figure 8:
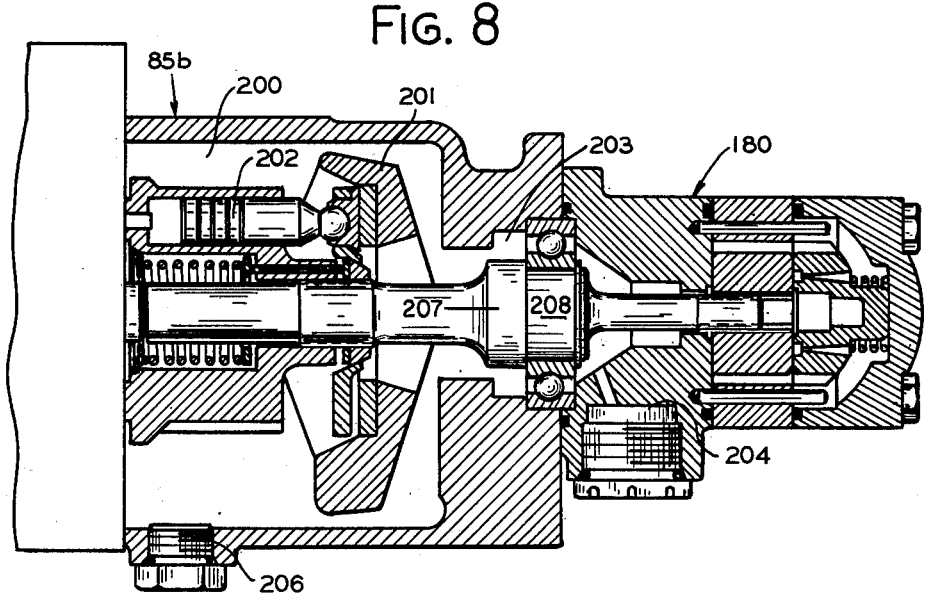
FIG. 8 is a partial sectional view of the pump shown in FIG. 7.

Referring now to the hydraulic system driving the vehicle, please see FIGS. 7 and 8. First and second variable displacement pump units 85a, 85b are driven on a common shaft connected to the engine drive shaft. First and second pumps 85a, 85b are operatively connected by hydraulic lines 170 to first and second hydraulic motors 86, 87 mounted on the transmission case of the vehicle.

Each of the first and second variable displacement pumps 85a, 85b includes a circular array of pistons and cylinders which revolve against swash plates which may be tilted by means of a control linkage (not shown) connected to respective controls 171, 172 on the first and second pumps 85a, 85b to vary the displacement of the pumps 85a, 85b. The control linkage is connected to control levers 25 on each side of the operator's seat 12 such that movement of either the right or left lever 25 will cause movement of control 171 or 172 so as to change the angle of the swash plate of either the pump 85a or 85b depending on the movement of the vehicle desired. It is understood of course, that the engine 81 will be driven at a constant rpm ordinarily and variable speed is attained by manipulation of the swash plate.

An implement pump 180 is axially aligned with the pumps 85a, 85b and is operatively connected by means of the hydraulic hoses 181 and 182 to a valve bank 183 which controls the lift and tilt cylinders 34, 37 connected by a linkage (not shown) such as described in application Ser. No. 635,559, now U.S. Pat. No. 4,043,416, supra, to the control lever 25. A separate hydraulic reservoir 185 (FIG. 4) is provided to supply fluid as needed for the hydraulic components of the vehicle. Each of the motors 86, 87 are provided with bleed-off lines 186, 188 directing hydraulic fluid to a cooler 190. The fluid is carried from the cooler to the inlet portion of the pump 180.

Referring further to the valve bank 184, valve ports 191, 192 operate the lift cylinders 34 and valve ports 193, 194 operate the tilt cylinder 37. More fluid is required to extend the cylinders 34, 37 than to retract them. Accordingly, additional fluid is drawn into the pump 180 from the reservoir 185 through lines 182. When the cylinders are retracted an excess of oil is available. The excess oil is carried back to the reservoir through lines 195 to by-pass valve 208 through lines 182. Line 209 carries oil from outlet 184 of valve bank 183 through filter 210 to main pumps 85a and 85b.

The pump 85b and implement pump 180 are shown in more detail in FIG. 8. The pump 85b comprises a swash plate 201 mounted in the pump section 200. A series of revolving pistons 202 engage the face of the swash plate 201 in the pump section 200. Pistons 202 are caused to revolve by driving the engine input shaft and the displacement of each piston per revolution may be adjusted by varying the angle of tilt of the swash plate 201. It may be pointed out that the position of swash plate 201 shown in FIG. 8 is neutral, with no piston displacement per revolution. Reverse and forward displacement results when swash plate 201 is tilted. The output of pump unit 85b is directed to hydraulic motor 87 to cause rotation of the output shaft in either the forward or the reverse direction.

Normally the output shafts 207 and 208 of pumps 85b and 180 are axially aligned with an oil seal therebetween to isolate the pumps from each other. Excess fluid passes from pump 85b to external piping carrying the fluid to the pump 180. In the present invention, pump inlet port 203 is provided between pumps 85 and 180 by removing the shaft oil seal therebetween, thus eliminating the need for fluid flow externally of the case of hydrostatic pump 85b to inlet port 204 of hydraulic auxiliary pump 180. Thus external piping from excess oil drain port 206 of pump 85b to inlet port 204 of pump 180 can be eliminated.

The vehicle shown and described thus presents an improved vehicle having a substantially lower profile, particularly suitable for low clearance applications. While only a single embodiment of our invention has been described in detail, it will be understood that the detailed description is intended to be illustrative only and that various modifications and changes may be made to our invention without departing from the spirit and scope of it, therefore the limits of the invention should be determined from the attached claims.

We claim:

1. In a skid steer vehicle, vehicle drive means comprising an engine mounted in the rear of the vehicle, a variable displacement pump driven by said engine, said variable displacement pump being characterized by a series of revolving pistons and cylinders, said pistons being displaced by an inclinable swash plate, a hydraulic pump for driving implements associated with the vehicle juxtapositioned forward of the variable displacement pump and axially aligned therewith, said drive means including an output shaft associated with the variable displacement pump and an output shaft associated with the implement pump, the respective shafts axially aligned, and internal connecting means between the variable displacement pump and the hydraulic implement pump comprising a passage between the respective pumps concentric with the axial shafts of the pumps, the passage providing an internal means for the flow of excess hydraulic fluid from the variable displacement pump to the implement pump, to supply the implement pump with inlet fluid.

* * * * *